(12) United States Patent
Beck et al.

(10) Patent No.: US 11,865,742 B2
(45) Date of Patent: Jan. 9, 2024

(54) PREFORM AND MOLD STACK

(71) Applicant: HUSKY INJECTION MOLDING SYSTEMS LTD., Bolton (CA)

(72) Inventors: Christophe Simon Pierre Beck, Terville (FR); Sebastian Rasche, Trier (DE)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 466 days.

(21) Appl. No.: 17/059,035

(22) PCT Filed: Jun. 14, 2019

(86) PCT No.: PCT/CA2019/050842
§ 371 (c)(1),
(2) Date: Nov. 25, 2020

(87) PCT Pub. No.: WO2020/006624
PCT Pub. Date: Jan. 9, 2020

(65) Prior Publication Data
US 2021/0213659 A1     Jul. 15, 2021

Related U.S. Application Data

(60) Provisional application No. 62/693,491, filed on Jul. 3, 2018.

(51) Int. Cl.
B29C 45/26    (2006.01)
B29C 45/27    (2006.01)
B29C 49/06    (2006.01)
B29L 31/00    (2006.01)

(52) U.S. Cl.
CPC ........ *B29C 45/261* (2013.01); *B29C 45/2711* (2013.01); *B29C 49/06* (2013.01); *B29C 2949/0724* (2022.05); *B29C 2949/0856* (2022.05); *B29L 2031/7158* (2013.01)

(58) Field of Classification Search
None
See application file for complete search history.

(56) References Cited

U.S. PATENT DOCUMENTS

| | | |
|---|---|---|
| 5,507,998 A | 4/1996 | Yokobayashi |
| 5,660,902 A | 8/1997 | Unterlander et al. |
| 6,649,121 B1 | 11/2003 | Hamamoto et al. |
| 7,128,865 B2 | 10/2006 | Martin |
| 7,402,333 B2 | 7/2008 | Nakamura et al. |
| 7,628,605 B2 | 12/2009 | Mai et al. |

(Continued)

FOREIGN PATENT DOCUMENTS

| | | |
|---|---|---|
| CN | 107405819 A | 11/2017 |
| DE | 102012004613 A1 | 7/2013 |

(Continued)

*Primary Examiner* — Elizabeth Collister

(57) ABSTRACT

According to the present invention there is provided a preform suitable for subsequent blow molding, and a mold stock for producing the preform. The preform comprises a base having an elliptical inner face with a first flat circular bottom portion, and an elliptical outer face with a second flat circular bottom portion. The first and second flat circular bottom portions each have a center on a vertical center axis of the preform and a radius of equal size.

15 Claims, 5 Drawing Sheets

(56) References Cited

U.S. PATENT DOCUMENTS

| | | |
|---|---|---|
| 7,887,744 B2 | 5/2011 | Yanagimachi et al. |
| 8,020,717 B2 | 9/2011 | Patel |
| 8,021,596 B2 | 9/2011 | Yoshiike et al. |
| 9,358,710 B2 | 6/2016 | Witz et al. |
| 9,415,531 B2 | 8/2016 | Aktas |
| 2005/0136150 A1 | 6/2005 | Martin |
| 2009/0078672 A1 | 3/2009 | Parrinello et al. |
| 2010/0323136 A1 * | 12/2010 | Yanagimachi ......... B29B 11/14 428/35.7 |
| 2014/0030461 A1 | 1/2014 | Bunel et al. |
| 2015/0352746 A1 | 12/2015 | Pagliacci |
| 2016/0368198 A1 | 12/2016 | Aktas |
| 2017/0157832 A1 | 6/2017 | Wagner et al. |

FOREIGN PATENT DOCUMENTS

| | | |
|---|---|---|
| GB | 2048757 A | 12/1980 |
| WO | 2012075578 A1 | 6/2012 |
| WO | 2016095020 A1 | 6/2016 |

* cited by examiner

PREFORM AND MOLD STACK

TECHNICAL FIELD

The present invention relates to a preform suitable for subsequent stretch blow molding and a mold stack for producing the preform.

BACKGROUND OF THE INVENTION

Particularly in the beverage and food industry, containers made of sheet material, glass or ceramics are increasingly being replaced by plastic containers. The user-friendly low weight of plastic containers, in particular plastic bottles, and the environment-friendly use of recyclable plastic materials in the production thereof certainly play a significant role in this substitution.

The preforms used for producing plastic bottles made, for example, from polyethylene terephthalate (PET), traditionally consist of a hollow cylindrical body, with constant or varying thickness, provided with an open end which already has the final shape of the bottle neck, and with a closed end having a hemispherical shape meant to form the bottom of the bottle.

In the production of plastic bottles, stretch blow molding, also referred to as biaxial molecular orientation blow molding, is a widely applied process, be it in terms of a two-stage stretch blow molding process or in terms of a single stage blow molding process. In the two-stage process, the preforms are molded in a dedicated injection molding equipment which produces fully cooled preforms. These preforms are packed and fed later into a stretch blow molding machine, where the preforms, in a first step, are heated up to a temperature sufficient for obtaining the requisite softening thereof and then are subjected to stretch blow molding. In the single-stage process, the injection molded preforms are sent directly to a stretch blow molding station integrated in the injection molding equipment.

When subjected to stretch blow molding, the relatively hot and deformable preform is placed in the metal blow-molding cavity which determines the shape of the final plastic bottle. Through movement of a stretch rod inserted into the preform via its open neck, the preform is stretched as far as the final length of the bottle has been obtained. Then, a pressurized fluid, usually compressed air, is introduced into the stretched preform for causing the preform material to adhere to the walls of the blow-mold cavity.

It is a matter of fact that regions of the inflating preform that must move and stretch a greater distance in a direction corresponding with the primary, i.e. longitudinal, axis of the bottle cross-sectional shape, will tend to thin more than regions that move in a direction generally corresponding with the secondary, i.e. transversal, axis of the bottle cross-sectional shape. Consequently, the material thickness distribution is not uniform across the bottle's sidewall.

A well-known technique applied to establish a more uniform material thickness distribution is commonly referred to as "heat profiling". That is, selected regions within the preform stretch are changed by changing the material temperature in those selected regions. As a slightly cooler preform region in the preform body portion will tend to resist and stretch less than in adjacent warmer regions, aligning the cooler preform regions with corresponding areas of the bottle which tend to have an otherwise relatively thinner wall thickness, will consequently stretch less, thereby improving material thickness distribution uniformity.

As it will be appreciated by those skilled in the art, heat profiling provides an effective tool for improving material thickness distribution uniformity within a preform's sidewall. With respect to the hemispherically shaped closed end employed in the traditional preform design, this tool, however, fails to improve the material thickness distribution uniformity of this region. This is as the hemispherically shaped closed end inherently is associated with a low surface to volume ratio, which ratio renders it virtually impossible to effectively heat profile sub-regions within the closed end. Thus, heat profiling does not work to prevent that unstretched amorphous material remains in the bottle base, in particular in the region around its gate nub.

US Patent Application No. 2014/0030461 A1 (BUNEL et al.; PUBLISHED 30 Jan. 2014) teaches an improvement to the bottom of preforms made of a thermoplastic material and used for the production of stretch blown molded bottles. The proposed arrangement provides a transition area in the bottom of the stretch blown molded bottle which transition area is said to be less prone to the phenomenon of fissuring between the central portion of the bottle bottom and the periphery thereof where the material is biaxially expanded.

In broad terms, the said bottom arrangement of a preform with a cylindrical body and a neck can be described as follows. In reference to an external central point OP located on the vertical center axis of the preform, the external contour of the preform bottom is provided by a spherical cap and a tapered surface, which surface, in reference to a point NP defining the junction between the external contour of the preform body and the one of the preform bottom, extends towards the spherical cap and is connected therewith via a toroidal ring having a surface that is tangent to both the spherical cap and the tapered surface. In reference to an internal point S located on the vertical center axis of the preform, the internal contour of the preform bottom is provided by a central rounded portion having the shape of a spherical dome, and a spherical surface, which surface, in reference to a point T located at the end of the envelope of the cylindrical cavity of the preform body, extends towards the spherical dome and is connected therewith via a toroidal annular surface created by an arc of a circle with a radius R.

Those skilled in the art will appreciate that this arrangement of the preform bottom is still not satisfactory. Albeit the tapered surface of the bottom's outer contour helps that the material in this region stretches out more effectively, due to the configuration of the internal and external contours of the preform bottom around the gate nub, unstretched and amorphous material inevitably will remain in the bottom of the stretch blown bottle, in particular in the region around its gate nub.

SUMMARY

The object underlying the present invention is to provide a preform suitable for subsequent stretch blow molding and mitigating the drawbacks associated with traditional preforms having a hemispherically shaped closed end.

This object is solved by a preform having the features defined by claim 1 and a mold stack having the features of claim 9.

According to the present invention, the closed end of the preform, i.e. the base thereof, has an elliptical inner face with a first flat circular bottom portion, and an elliptical outer face with a second flat circular bottom portion, wherein the first and second flat circular bottom portions each have a center on a vertical center axis of the preform and a radius R of equal size.

The elliptically shaped inner and outer faces of the base provide for a continuous reduction of a wall thickness defined therebetween and, in concert with the flat circular bottom portions, they provide a defined area of an evenly reduced bottom wall thickness in the region of the gate nub. The material reduction in the regions of the base which in the inflated preform move in a direction generally corresponding with the transversal axis of the bottle cross-sectional shape, thus provides that these regions effectively stretch out and thin accordingly. Further, otherwise unstretched material locked in amorphous form in the region around the gate nub of the stretch blown bottle, is made available for distribution in the body and shoulder area of the bottle, thereby improving bottle performance while providing a bottle advantageously having a lower base weight. Yet further, the elliptically shaped inner and outer faces together with the respective flat circular bottom portions provide an increase of the surface to volume ratio of the base, thereby making effective heat profiling of the base possible.

Preferably, the elliptical inner and outer faces of the base each extend tangentially from a respective distal end of the inner and outer faces of the preform body. Further, a first ellipse defining the elliptical inner face and a second ellipse defining the elliptical outer face each have a center spaced from the vertical center axis of the preform by a radius which is equal to the radius R of the first and second flat circular bottom portions. Accordingly, the first flat circular bottom portion extends tangentially from the elliptical inner face and the second flat circular bottom portion extends tangentially from the elliptical outer face.

The tangencies at the intersections of the distal end of the inner and outer faces of the preform body and the inner and outer elliptical faces of the base advantageously support the flow of the melt during the injection molding process as well as for subsequent stretch blow-molding. By way of the elliptical inner and outer faces of the base, the wall thickness defined therebetween is continuously reduced. Thus, the tangencies at the intersections of the elliptical inner and outer faces and the first and second flat circular bottom sections provide that the bottom wall thickness defined between the first and second flat circular bottom portions is equal to the smallest wall thickness resulting from the continuous wall thickness reduction through the elliptical inner and outer faces. Accordingly, material in the gate nub area will more readily stretch out and thin accordingly.

Preferably, the first ellipse defining the elliptical inner face has a first radius $IR_1$ which is in parallel with the vertical center axis of the perform and a second a second radius $IR_2$ which is perpendicular to said vertical center axis, wherein the first radius $IR_1$ is greater than both the second radius $IR_2$ and a radius of a cylindrical inner face of the preform body. Similarly, the second ellipse defining the elliptical outer face has a first radius $OR_1$ which is in parallel with the vertical center axis of the preform and a second radius $OR_2$ which is perpendicular to the vertical center axis, wherein the first radius $OR_1$ is greater than both the second radius $OR_2$ and a radius of a cylindrical outer face of the preform body. The such configured preform base has an elongate shape and thus provides for a surface to volume ratio, which is of advantage for effectively heat profiling the preform base.

Preferably, the radius R of the first and second flat circular bottom portions is equal to 0.4 times of the radius of the cylindrical outer face of the preform body.

In an embodiment of a preform having a base in accordance with the present invention, the preform body consists of a body main portion and a transition portion which extends from the preform neck and forms a shoulder area in the final bottle. Preferably, the transition portion has a cylindrical outer face having a diameter equal to a diameter of both a cylindrical outer face of the neck and a cylindrical outer face of the body main portion, and a conical inner face with decreasing diameter. Preferably, the conical inner face of the transition portion extends tangentially from a cylindrical inner face of the neck, and the cylindrical inner face of the body main portion extends tangentially from the conical inner face of the transition portion.

Since the open end of a preform of the species in question already has the final shape of the bottle neck, the outer face of the neck, preferably, carries a neck finish configured to receive a closure of the bottle, and a support ledge, i.e. a circular ring for handling the preform during blow molding and the final bottle during the filling stages.

The mold stack featured according to a non-limiting embodiment of the present invention for injection molding a preform suitable for subsequent stretch blow molding comprises a core insert, a split mold insert, a cavity insert and a gate insert, which in concert define a mold cavity. The core insert comprises a first cavity defining portion configured to define an inner face of a neck and a body of the preform, and, via a gate defining portion thereof, an inner face of a base of the preform. The split mold insert is configured to define an outer face of the preform neck, the cavity insert is configured to define an outer face of the preform body, and the gate insert comprising a second cavity defining portion is configured to define an outer face of the preform base.

According to the present invention, the gate defining portion of the first cavity defining portion of the core insert has a first elliptical curvature with a first flat circular bottom portion, and the second cavity defining portion of the gate insert has a second elliptical curvature with a second flat circular bottom portion, wherein said first and second flat circular bottom portions each have a center on a vertical center axis of the mold stack and a radius R of equal size. Accordingly, the injection molded preform has a base having an elliptical inner face with a first flat circular bottom portion, an elliptical outer face with a second flat circular bottom portion, and the first and second flat circular bottom portions each have a center on a vertical center axis of the preform and a radius of equal size. The, elliptically shaped inner and outer faces of the base of the injection molded preform thus provide for a continuous reduction of material in that region and, in concert with the first and second flat circular bottom portions, in a region of the gate nub area, they provide a defined area of an evenly reduced wall thickness. The material reduction in the regions of the preform base which in the inflated preform move in a direction generally corresponding with the transversal axis of the bottle cross-sectional shape, provides that these regions will stretch out effectively and thin accordingly. Further, otherwise unstretched material locked in amorphous form in the region around the gate nub of the stretch blown bottle is made available for distribution in the body and the shoulder area of the bottle, thereby improving bottle performance, while providing a bottle advantageously having a lower base weight. Yet further, the elliptically shaped inner and outer faces of the preform base together with the respective first and second flat circular bottom portions provide an increase of the surface to volume ratio of the preform base, thereby making an effective heat profiling of the preform's base possible.

Preferably, the first elliptical curvature of the gate defining portion of the core insert is tangent with a distal end of the first cavity defining portion of the core insert, and the second elliptical curvature of the second cavity defining portion of the gate insert is tangent with a distal end of an inner surface of the cavity insert defining the outer face of the preform body. Further, a first ellipse defining the first elliptical curvature and a second ellipse defining the second elliptical curvature each have a center spaced from the vertical center axis of the mold stack by a radius equal to the radius R of the first and second flat circular bottom portions. Accordingly, the first flat circular bottom portion is tangent with the first elliptical curvature and the second flat circular bottom portion is tangent with the second elliptical curvature.

The tangency at the intersection of the first elliptical curvature and a distal end of the first cavity defining portion of the core insert and the tangency at the intersection of the second elliptical curvature and the distal end of an inner surface of the cavity insert defining the outer face of the preform body, advantageously support the flow of the melt in the mold cavity during the injection molding process as well as for subsequent stretch blow-molding. Further, the elliptical first and second curvatures provide that the wall thickness of the preform's base defined accordingly is continuously reduced. Thus, the tangencies at the intersections at the first and second elliptical curvatures and the first and second flat circular bottom sections provide that the preform's wall thickness defined by the first and second bottom portions is equal to a smallest wall thickness of the preform base resulting from the continuously reduced wall thickness provided by the first and second elliptical curvatures. Accordingly, it is provided that material in the preform's gate nub area effectively can stretch out and thin accordingly.

Preferably, the first ellipse defining the first elliptical curvature has a first radius $IR_1$ which is in parallel with the vertical center axis of the mold stack and a second radius $IR_2$ which is perpendicular to the vertical center axis of the mold stack, wherein the first radius $IR_1$ is greater than both the second radius $IR_2$ and a radius of the first cavity defining portion of the core insert defining at least in part a cylindrical inner face of the preform body. Similarly, the second ellipse defining the second elliptical curvature has a first radius $OR_1$ which is parallel to the vertical center axis of the mold stack and a second radius $OR_2$ which is perpendicular to the vertical center axis of the mold stack, wherein the first radius $OR_1$ is greater than both the second radius $OR_2$ and a radius of the inner surface of the cavity insert defining a cylindrical outer face of the preform body.

Configuring the first elliptical curvature of the gate defining portion of the core insert and the second elliptical curvature of the second cavity defining portion of the gate insert in such a way, provides that the preform base will be more elongate in shape, which elongate shape is in particular of advantage for effectively heat profiling the preform base.

Preferably, the radius R of the first and second flat circular bottom portions provided by the gate defining portion of the first cavity defining portion of the core insert and the second cavity defining portion of the gate insert, respectively, is equal to 0.4 times of a radius R of the cavity insert defining the cylindrical outer face of the preform body.

In an embodiment of the mold stack of the present invention, the first cavity defining portion of the core insert defining the inner face of the preform neck and the preform body further comprises a transition portion which is tangent with a neck defining portion of the first cavity defining portion of the core insert, and a main portion which is tangent with the transition portion. Preferably, the transition portion is configured to define a conical inner face with decreasing diameter of a transition portion of the preform body, and the main portion is configured to define a cylindrical inner face of a main body portion of the preform body.

Preferably, the neck defining portion of the first cavity defining portion of the core insert is configured to define a cylindrical inner face of the preform neck, and the split mold insert pair is configured to define a cylindrical outer face with a neck finish and a support ledge of the preform neck.

DESCRIPTION OF THE DRAWINGS

The non-limiting embodiments of the present invention will be more fully appreciated by reference to the accompanying drawings, in which.

The drawings serve the purpose of illustration and are not to scale.

DETAILED DESCRIPTION OF THE NON-LIMITING EMBODIMENTS

Reference will now be made to non-limiting embodiments of a preform implement according to the present invention and a mold stack for producing the same. It should be understood that other modifications and equivalents will be evident to those skilled in the art in view of the non-limiting embodiments disclosed herein and those variants should be considered to be within the scope of the present invention.

Further, it will be recognized by those skilled in the art that certain structural and/or operational details of the non-limiting embodiments discussed hereinafter may be modified or amended.

Figure 1:
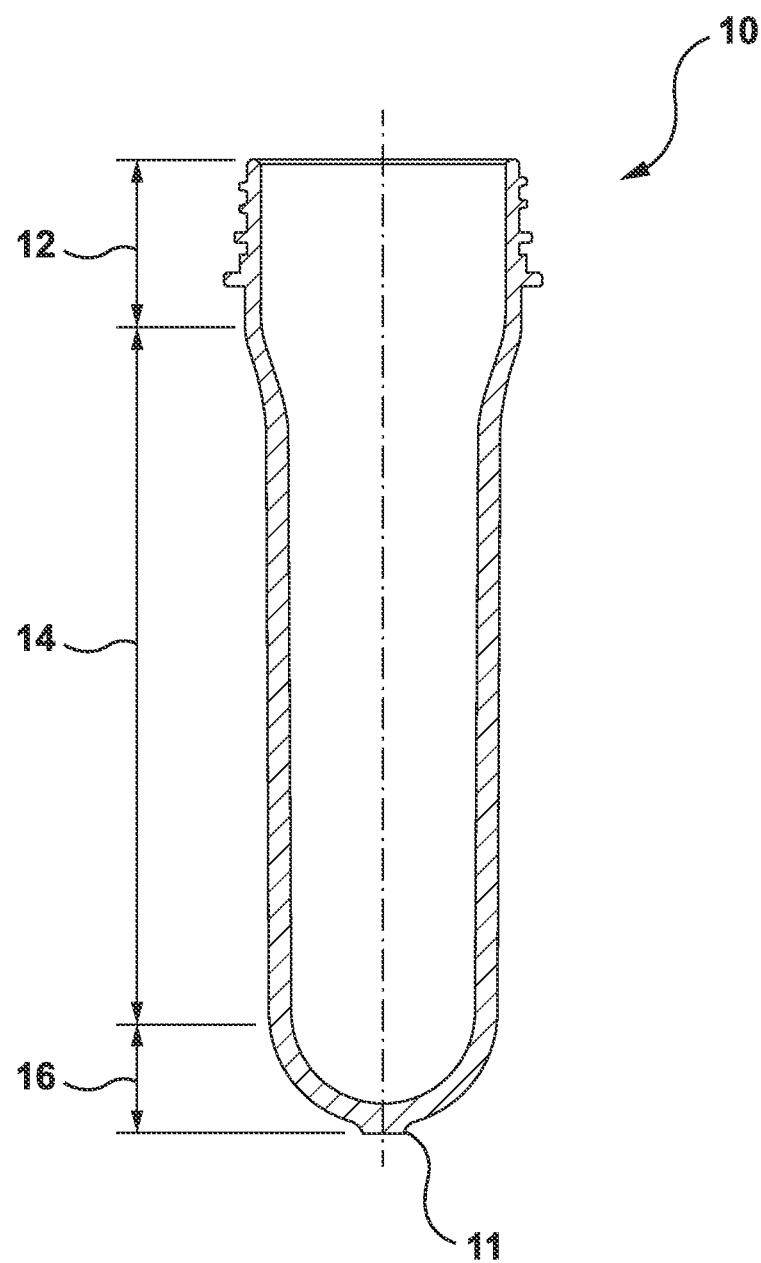
FIG. 1 depicts a cross-section view of an example of a traditional preform 10 having a hemispherically shaped base.

FIG. 1 depicts an example of a traditional preform 10 which, as stated above, has a closed end, i.e. a base, which is hemispherically shaped. As shown, preform 10 has a neck 12, a body 14 and a base 16 with hemispherically shaped inner and outer faces. Also shown is a gate nub 11 which so to speak is the "foot print" of the injection molding process.

In the final bottle produced from such a traditional preform, the wall thickness distribution in the bottle base is not uniform because for the reasons outlined above, unstretched material in amorphous form remains in the gate nub area of the bottle base.

Figure 2:
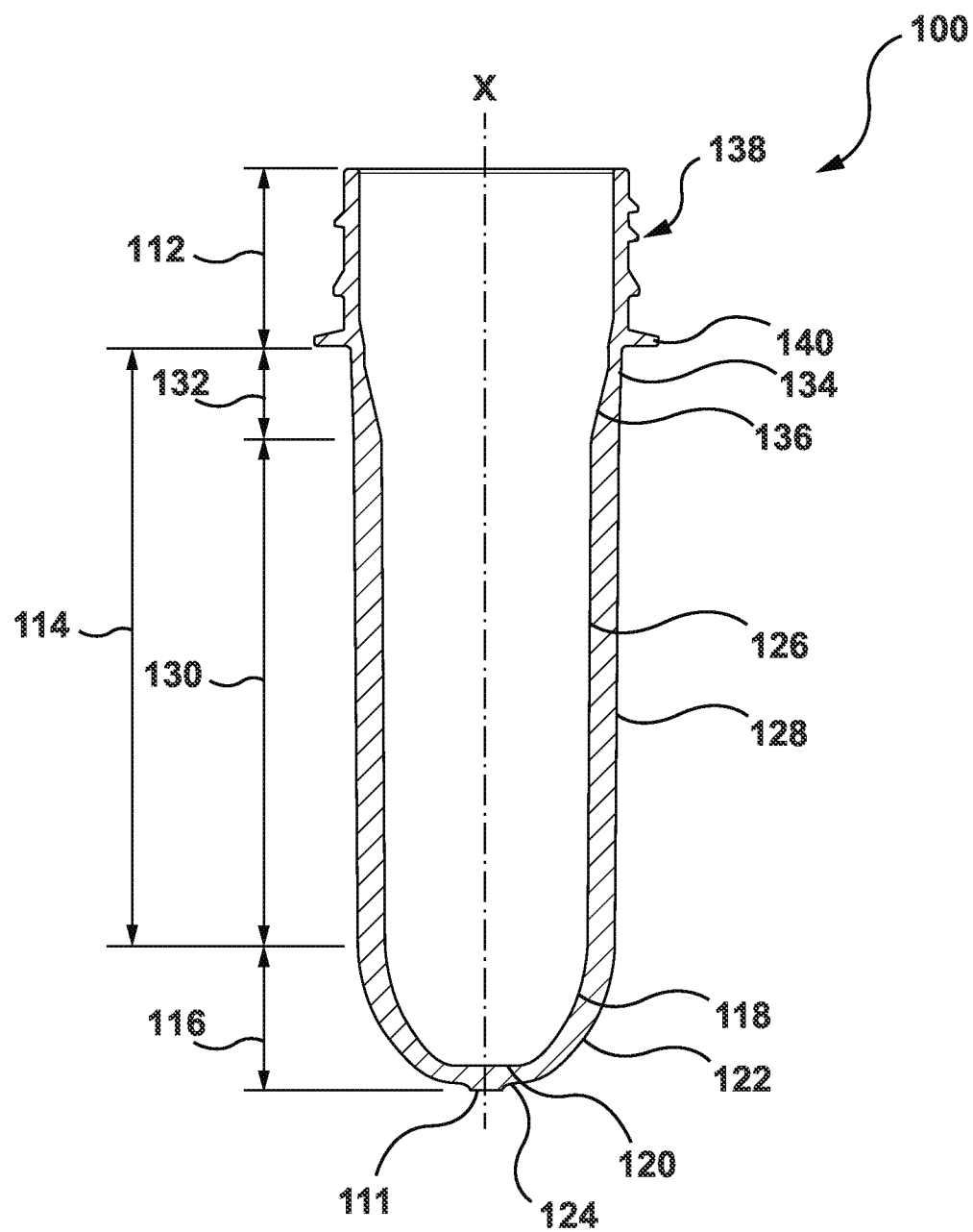
FIG. 2 depicts a cross-section view of an embodiment of a preform 100 having a base implement according to the present invention.

FIG. 2 depicts a preform 100 implemented according to a non-limiting embodiment of the present invention. The preform 100 consists of a neck 112, a base 116 and a body 114 extending between the neck 112 and the base 116. The neck 112, the body 114 and the base 116 each have inner and outer faces defining a respective wall thickness therebetween.

As shown, the base 116 has an elliptical inner face 118 with a first flat circular bottom portion 120, and an elliptical outer face 122 with a second flat circular bottom portion 124. The first and second flat circular bottom portions 120, 124 each have a center on a vertical center axis X of the preform 100 and a radius R (not shown) of equal size. As it is apparent from FIG. 2, the elliptically shaped inner and outer faces 118, 122 of base 116 provide for a continuous reduction of the wall thickness defined therebetween, and in concert with the first and second flat circular bottom portions 120, 124, they provide in the region of the gate nub 111 a defined area of an evenly reduced bottom wall thickness.

FIG. 2 further shows that the elliptically shaped inner and outer faces 118, 122 extend tangentially from a cylindrically shaped distal end of the inner and outer faces 126, 128 of the body 114, and that the first and second flat circular bottom portions 120, 124 extend tangentially from the elliptically shaped inner and outer faces 118, 122. The latter tangency is obtained in that a first ellipse defining the elliptical inner face 118 and a second ellipse defining the elliptical outer face 122 each have a center spaced from a vertical center axis X of the preform 100 by a radius which is equal to the radius R of the first and second flat circular bottom portions 120, 124.

From FIG. 2 one will further appreciate that base 116 has an elongate shape. In order to obtain such a configuration of the base, the radius of the first ellipse defining the elliptical inner face 118 of the base 116 has a first radius $IR_1$ (not shown) which is in parallel with the vertical center axis X of the preform 100, and a second radius $IR_2$ (not shown) which is perpendicular to the vertical center axis X. The first radius $IR_1$ is such selected that it is greater than both the second radius $IR_2$ and a radius defining a cylindrical inner face 126 of the body 114, which radius, in the depicted embodiment, defines the cylindrical inner face of a main portion 130 of the body 114 of the preform 100. Similarly, the second ellipse defining the elliptical outer face 122 of the base 116 has a first radius $OR_1$ (not shown) which is in parallel with the center axis X of the preform 100, and a second radius $OR_2$ (not shown) which is perpendicular to the center axis X, wherein the first radius $OR_1$ is such selected that it is greater than both the second radius $OR_2$ and a radius defining a cylindrical outer face 128 of the body 114, which radius, in the depicted embodiment, defines the cylindrical outer face of the main portion 130 of the body 114 of the preform 100.

In the embodiment depicted in FIG. 2, the aforesaid main portion 130 of body 114 has cylindrical inner and outer faces 126, 128 and is associated with a transition portion 132 which extends from the neck 112 and forms a shoulder area in the final bottle. As shown, the transition portion 132 has a cylindrical outer face 134 having a diameter equal to both a diameter of a cylindrical outer face of the neck 112 and a diameter of the cylindrical outer face 128 of the body main portion 130. The inner face 136 of the transition portion has a first part without a draft and a second part that has a conical shape with a continuously decreasing diameter, and a diameter at a distal end of the conical inner face 136 is such selected that the inner face 126 of the body main portion 130 extends tangentially therefrom.

The outer face of the neck 112 carries a neck finish 138 which in the depicted embodiment is configured to threadably receive a closure cap of the final bottle, and a support ledge 140, i.e. a circular ring, for handling the preform during blow molding and the final bottle during the filling stages.

In an alternative embodiment (not shown), the transition portion of the body has an inverse design. Accordingly, the transition portion has a cylindrical inner face with a diameter equal to a diameter of the cylindrical inner face of the body main portion, and a conical outer face with a continuously increasing diameter, wherein the cylindrical outer face of the body main portion extends tangentially from the conical outer face of the transition portion, and the inner and outer faces of the transition portion extend tangentially from cylindrical inner and outer faces of the neck.

In a further alternative embodiment (not shown), the inner and outer faces of the transition portion each are conical with a continuously decreasing diameter, and extend tangentially from cylindrical inner and outer faces of the neck, and the inner and outer cylindrical faces of the body main portion extend tangentially from the inner and outer faces of the transition portion.

In a yet further embodiment (not shown), the inner and outer faces of the body main portion each are conical and taper towards the base, such that a uniform wall thickness of the body main portion is defined therebetween. The inner and outer faces of the transition portion each are conical with a continuously decreasing diameter, wherein the conical inner and outer faces of the transition portion extend tangentially from cylindrical inner and outer faces of the neck, and the conical inner and outer faces of the body main portion extend tangentially from the conical inner and outer faces of the transition portion.

Figure 3:
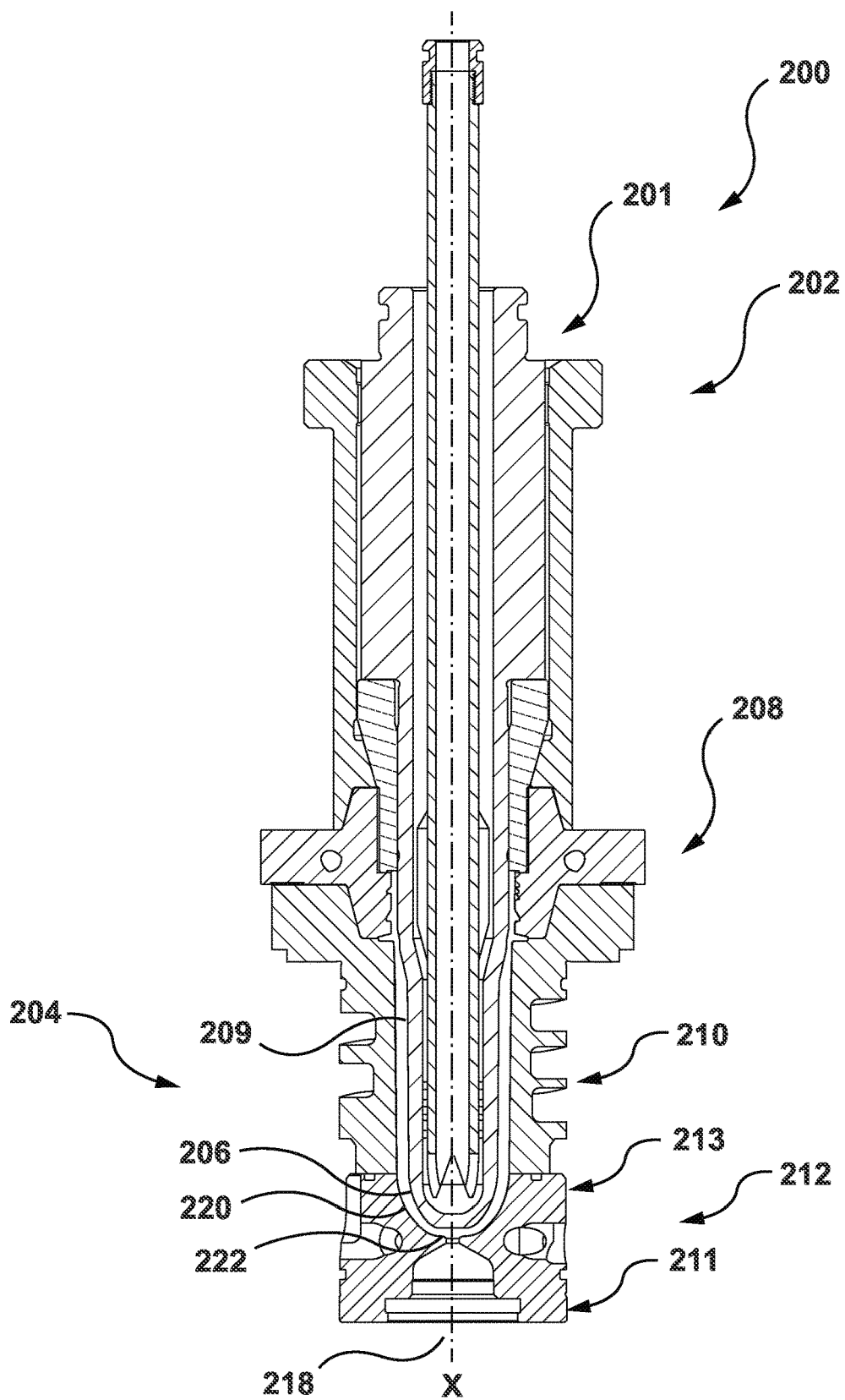
FIG. 3 depicts a cross-section view of a mold stack 200 configured to produce the preform 100 of FIG. 2.

With reference to FIG. 3, there is depicted a mold stack 200 configured to produce the preform 100 shown in FIG. 2. The mold stack comprises a core insert 202, a split mold insert pair 208, a cavity insert 210 and a gate insert 212.

Figure 4:
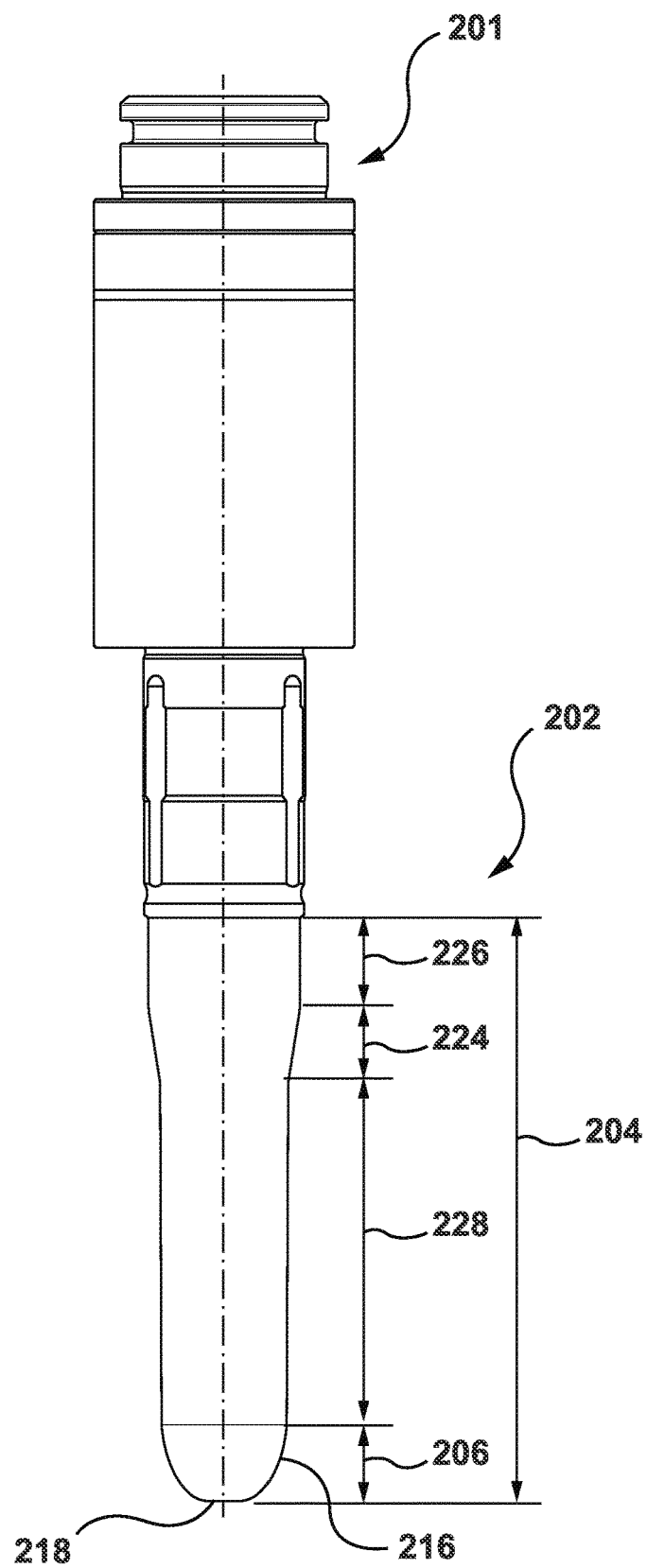
FIG. 4 depicts a side view of a core insert 202 of the mold stack of FIG. 3.

With continued reference to FIG. 3 and with reference to FIG. 4, the core insert 202 comprises a first cavity defining portion 204 including a gate defining portion 206 and, for attachment to a core plate (not shown), an attachment portion 201. The first cavity defining portion is configured to define an inner face of the neck and the body of the preform 100, and the gate defining portion 204 is configured to define an inner face of the base thereof.

As shown in FIG. 3, the split mold insert pair 208 is configured to define an outer face of the preform neck, and the cavity insert 210 is configured to define an outer face of the body of the preform 100.

Figure 5:
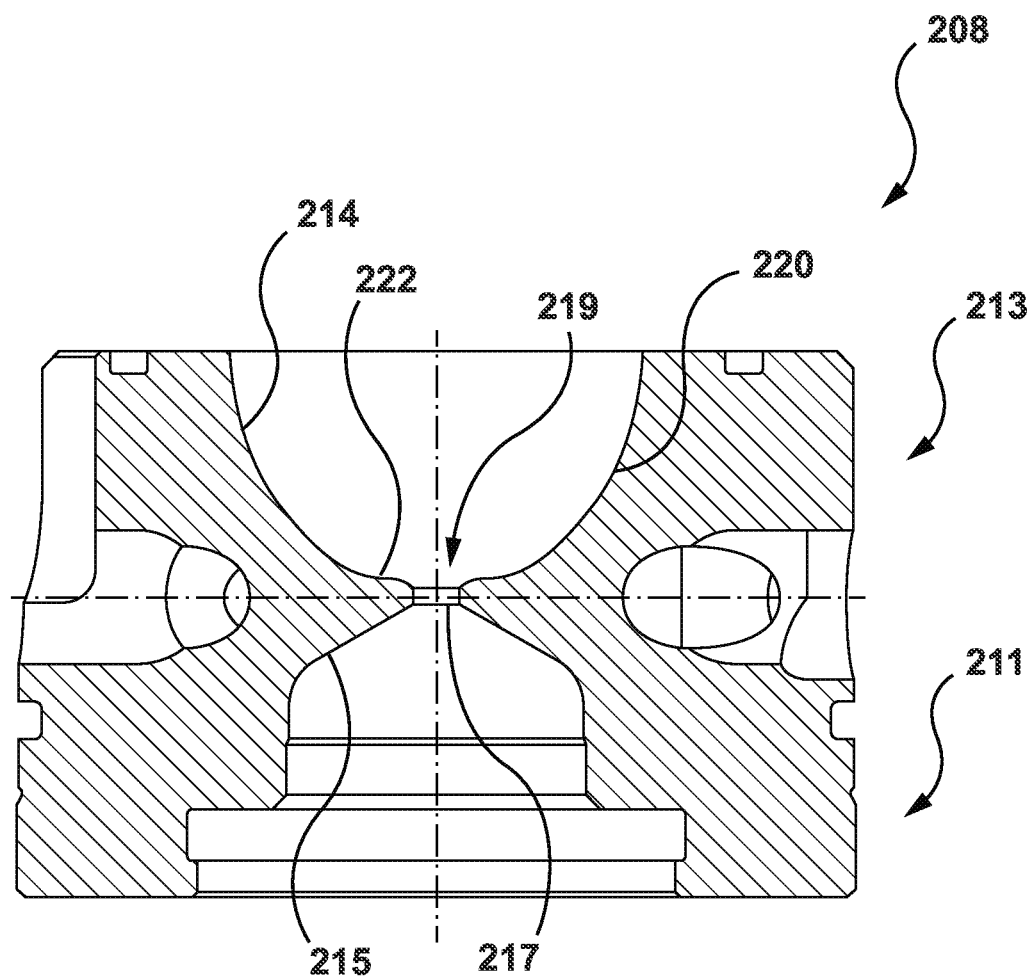
FIG. 5 depicts a cross-section view of a gate insert 212 of the mold stack of FIG. 3.

With continued reference to FIG. 3 and with reference to FIG. 5, the gate insert 212 is of generally two-part construction having a first portion 211 and a second portion 213. The first portion 211 generally lines a region 215 surrounding a nozzle tip (not shown) and, in case of a valve gated nozzle, forms a gate land area 217. The second portion 213 forms a second cavity defining portion 214 adjacent the nozzle tip and is configured to define the outer face of the preform base. Further, the second portion 213 forms a passage 219 for the flow of a resin into a mold cavity 209 defined, in concert, by the first cavity defining portion of the core insert 202, the split mold insert pair 208, the cavity insert 210 and the second cavity defining portion 214 of the second portion 213 of the gate insert 212.

As shown in FIGS. 3, 4 and 5, the gate defining portion 206 of the first cavity defining portion 204 of core insert 202 has a first elliptical curvature 216 with a first flat circular bottom portion 218, and the second cavity defining portion 214 of the gate insert 212 has a second elliptical curvature 220 with a second flat circular bottom portion 222. The first and second flat circular bottom portions 218, 222 each have a center on a vertical center axis X of the mold stack 200, and a radius R (not shown) of equal size. Accordingly—and as shown in FIG. 3 —, it is provided that by way of the first and second elliptical curvatures 216, 220 correspondingly elliptically shaped inner and outer faces of the preform base 114 define a wall thickness therebetween that is continuously reduced. Further, the first and second elliptical curvatures 216, 220 provide in concert with the first and second flat circular bottom portions 218, 222 that in the region of the preform's gate nub, there is an area—defined by correspondingly shaped first and second flat circular bottom portions of the preform base—of an evenly reduced bottom wall thickness.

From FIGS. 3 and 4 one will appreciate that the first elliptical curvature 216 of the first cavity defining portion 204 of the core insert 202 is tangent with a distal end thereof and, with reference to FIG. 3, that the second elliptical curvature of the second cavity defining portion 214 of the gate insert 212 is tangent with a distal end of an inner face of the cavity insert 210 defining the outer face of the preform body. Further, one will appreciate from FIG. 3 that the first and second flat circular bottom portions 218, 222 are tangent with the first and second elliptical curvatures 216, 220. These tangencies are obtained in that a first ellipse defining the first elliptical curvature 216 and a second ellipse defining the second elliptical curvature 220 each have a center spaced from a vertical center axis X of the mold stack 200 by a radius which is equal to the radius R of the first and second flat circular bottom portions 218, 222.

The preform base defined by the gate defining portion 206 of the first cavity defining portion 204 of the core insert 202 and the second cavity defining portion 214 of the gate insert 212, has an elongate shape as shown in FIG. 3. This elongate shape is obtained in that the first ellipse defining the first elliptical curvature 216 of the gate defining portion 206 has a first radius $IR_1$ (not shown) which is in parallel with the vertical axis X of the mold stack 200, and a second radius $IR_2$ (not shown) which is perpendicular to the vertical axis X, with the first radius $IR_1$ being greater than both the first radius $IR_1$ and a radius of the first cavity defining portion 204 of the core insert 202 configured to define a cylindrical inner face of the preform body; and in that the second ellipse defining the second elliptical curvature 220 of the second cavity defining portion 214 of the gate insert 212 has a first radius $OR_1$ (not shown) which is in parallel with the vertical center axis of the mold stack 200, and a second radius $OR_2$ (not shown) which is perpendicular to the vertical center axis X of the mold stack 200, with the first radius $OR_1$ being greater than both the second radius $OR_2$ and a radius of an inner surface of the cavity insert 210 configured to define a cylindrical outer face of the preform body.

In the embodiment of the mold stack 200 depicted in FIG. 3, the first cavity defining portion 204 of the core insert 202 configured to define the inner face of the preform neck and the preform body, further comprises a transition portion 224 configured to define a corresponding transition portion of the inner face of the preform body, and a main portion 228 configured to define a corresponding main portion of the inner face of the preform body. In the embodiment shown, the transition portion 224, is conical and has a diameter which, in reference to the cylindrical main portion 228, decreases. As one will appreciate from FIGS. 3 and 4, a proximal end of the transition portion 224 is tangent with the neck defining portion 226 of the first cavity defining portion 204 of the core insert 202, and a distal end of the transition portion 224 is tangent with a proximal end of the main portion 228 of the first cavity defining portion 204.

In the shown embodiment, the neck defining portion 226 of the first cavity defining portion 204 of the core insert 202 is configured to define a cylindrical inner face of the preform neck, and the split mold insert pair 208 is configured to define a cylindrical outer face of the preform neck as well as a neck finish and a support ledge thereof.

It is noted that the foregoing has outlined some of more pertinent non-limiting embodiments. It will be clear to those skilled in the art that embodiments to the disclosed non-limiting embodiments can be elected without departing from the spirit and scope thereof. As such, the described non-limiting embodiments ought to be considered to be merely illustrative of some of the mere prominent features and applications.

What is claimed is:

1. A preform suitable for subsequent blow molding, the preform comprising:
    a neck, a base and a body extending therebetween, the neck, the body and the base each having inner and outer faces defining a wall thickness therebetween,
    the base having an elliptical inner face with a first flat circular bottom portion, and an elliptical outer face with a second flat circular bottom portion, and
    the first and second flat circular bottom portions each having a center on a vertical center axis of the preform and a radius R of equal size.

2. The preform according to claim 1, wherein
    the elliptical inner face of the base extends tangentially from a distal end of an inner face of the body, and the elliptical outer face of the base extends tangentially from a distal end of an outer face of the body, and
    a first ellipse defining the elliptical inner face and a second ellipse defining the elliptical outer face each have a center spaced from the vertical center axis of the preform by a radius equal to the radius R of the first and second flat circular bottom portions.

3. The preform according to claim 2, wherein
    the first ellipse defining the elliptical inner face has a first radius IR1 being parallel to the vertical center axis of the preform and a second radius IR2 being perpendicular to the vertical center axis of the preform, the first radius IR1 being greater than both the second radius IR2 and a radius of a cylindrical inner face of the body, and
    the second ellipse defining the elliptical outer face has a first radius OR1 being parallel to the vertical center axis of the preform and a second radius OR2 being perpendicular to the vertical axis of the preform, the first radius OR1 being greater than both the second radius OR2 and a radius of a cylindrical outer face of the body.

4. The preform according to claim 3, wherein
    the radius R of the first and second flat circular bottom portions is equal to 0.4 times of the radius of the cylindrical outer face of the body.

5. The preform according to claim 1, wherein the body consists of a body main portion, and a transition portion extending from the neck.

6. The preform according to claim 5, wherein
    the transition portion has a cylindrical outer face with a diameter equal to a diameter of a cylindrical outer face of the body main portion, and a conical inner face with a continuously decreasing diameter, and wherein
    the inner face of the body main portion extends tangentially from the conical inner face of the transition portion.

7. The preform according to claim 6, wherein
    the neck has cylindrical inner and outer faces, and
    the outer and inner faces of the transition portion extend tangentially from the outer and inner faces of the neck.

8. The preform according to claim 1, wherein
    the neck on its outer face carries a neck finish and a support ledge.

9. A mold stack for injection molding a preform having a neck, a body and a base, the mold stack comprising:
    a core insert comprising a first cavity defining portion configured to define an inner face of the neck and the body of the preform and, via a gate defining portion thereof, an inner face of the base of the preform, a split mold insert pair configured to define an outer face of the neck of the preform, a cavity insert configured to define an outer face of the body of the preform, and a gate insert comprising a second cavity defining portion configured to define an outer face of the base of the preform;

the gate defining portion of the first cavity defining portion of the core insert having a first elliptical curvature with a first flat circular bottom portion, and the second cavity defining portion of the gate insert having a second elliptical curvature with a second flat circular bottom portion, and the first and second flat circular bottom portions each having a center on a vertical center axis of the mold stack and a radius R of equal size.

10. The mold stack according to claim 9, wherein the first elliptical curvature of the gate defining portion of the core insert is tangent with a distal end of the first cavity defining portion of the core insert, and the second elliptical curvature of the second cavity defining portion is tangent with a distal end of an inner surface of the cavity insert defining the outer face of the body of the preform, and wherein a first ellipse defining the first elliptical curvature and a second ellipse defining the second elliptical curvature each have a center spaced from the vertical center axis of the mold stack by a radius equal to the radius R of the first and second flat circular bottom portions.

11. The mold stack according to claim 10, wherein the first ellipse defining the first elliptical curvature has a first radius IR1 being parallel to the vertical center axis of the mold stack and a second radius IR2 being perpendicular to the vertical center axis of the mold stack, the first radius IR1 being greater than both the second radius IR2 and a radius of the first cavity defining portion of the core insert defining at least in part a cylindrical inner face of the body of the preform, and the second ellipse defining the second elliptical curvature has a first radius OR1 being parallel to the vertical center axis of the mold stack and a second radius OR2 being perpendicular to the vertical center axis of the mold stack, the first radius OR1 being greater than both the second radius OR2 and a radius of an inner surface of the cavity insert defining a cylindrical outer face of the body of the preform.

12. The mold stack according to claim 11, wherein the radius R of the first and second flat circular bottom portions is equal to 0.4 times of the radius of the cavity insert defining the cylindrical outer face of the body of the perform.

13. The mold stack according to claim 9, wherein the first cavity defining portion of the core insert defining the inner face of the neck and the body of the preform, further comprises a transition portion being tangent with a neck defining portion of the first cavity defining portion, and a main portion being tangent with the transition portion of the first cavity defining portion.

14. The mold stack according to claim 13, wherein the transition portion is conical in shape and configured to define a conical inner face with decreasing diameter of a transition portion of the body of the preform, and the main portion is configured to define a cylindrical inner face of a main body portion of the body of the preform.

15. The mold stack according to claim 14, wherein the split mold insert pair in configured to define a cylindrical outer face with a neck finish and a support ledge of the preform neck, and a neck defining portion of the first cavity defining portion of the core insert is configured to define a cylindrical inner face of the preform neck.

* * * * *